United States Patent Office 2,786,234
Patented Mar. 26, 1957

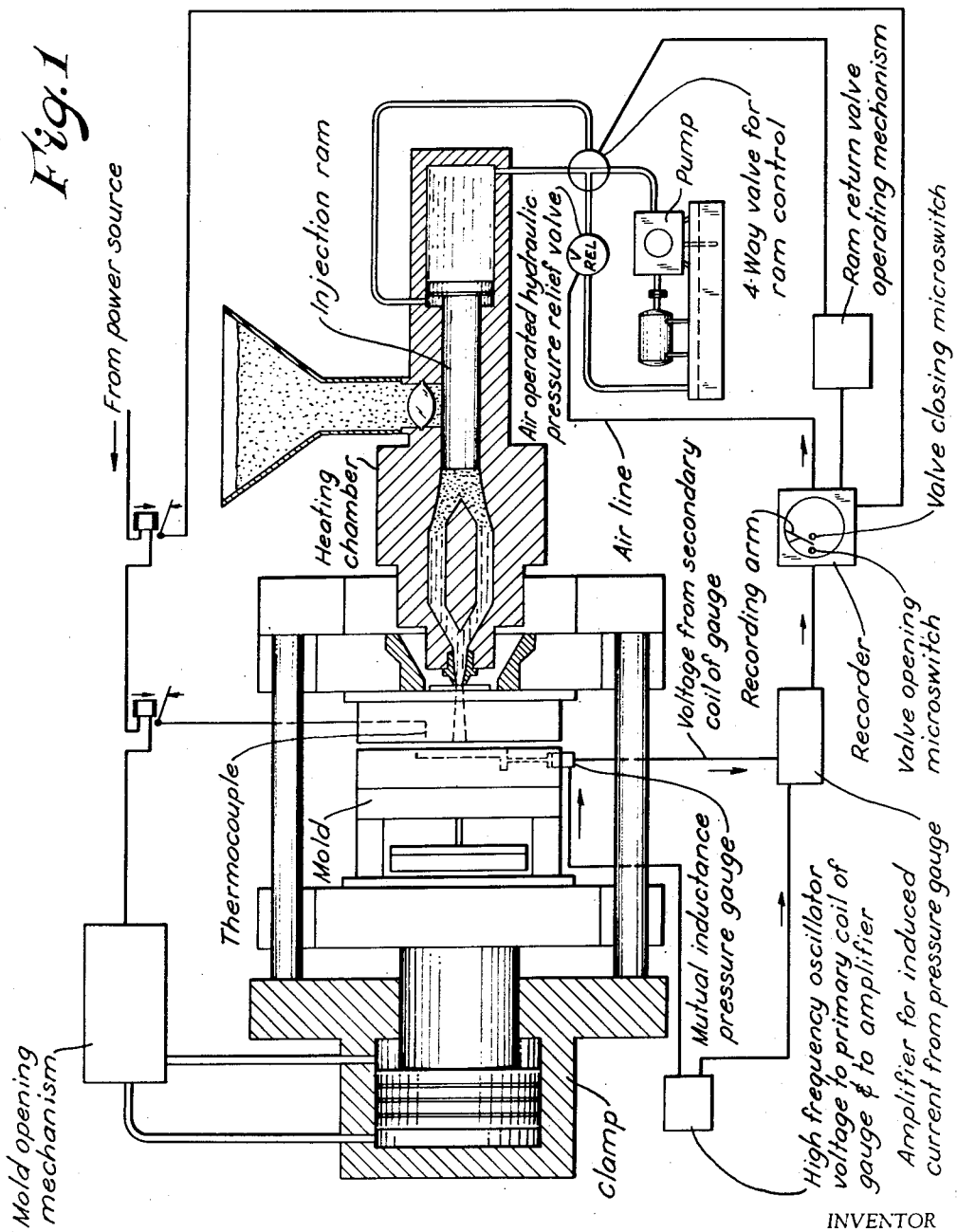

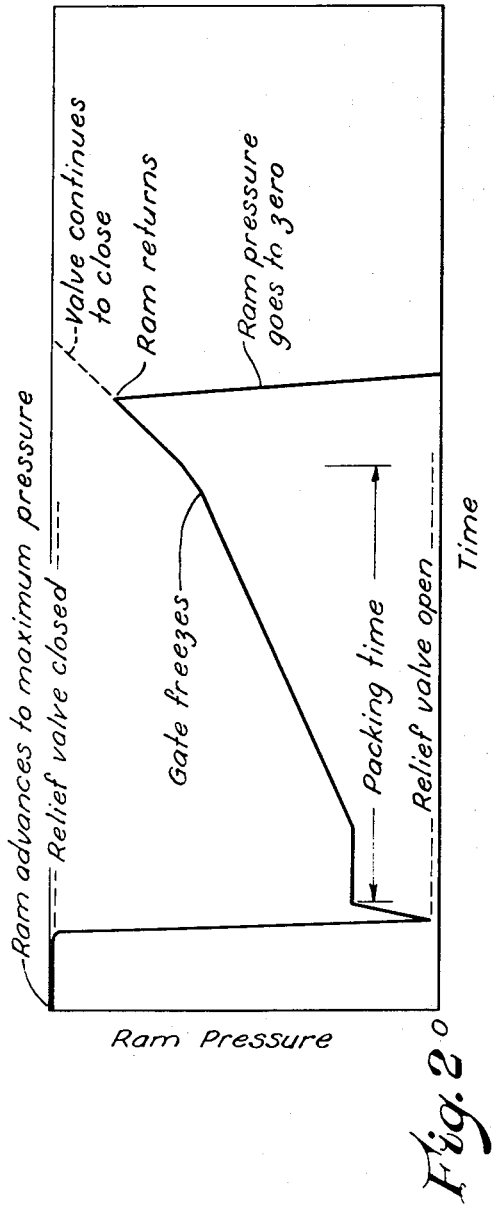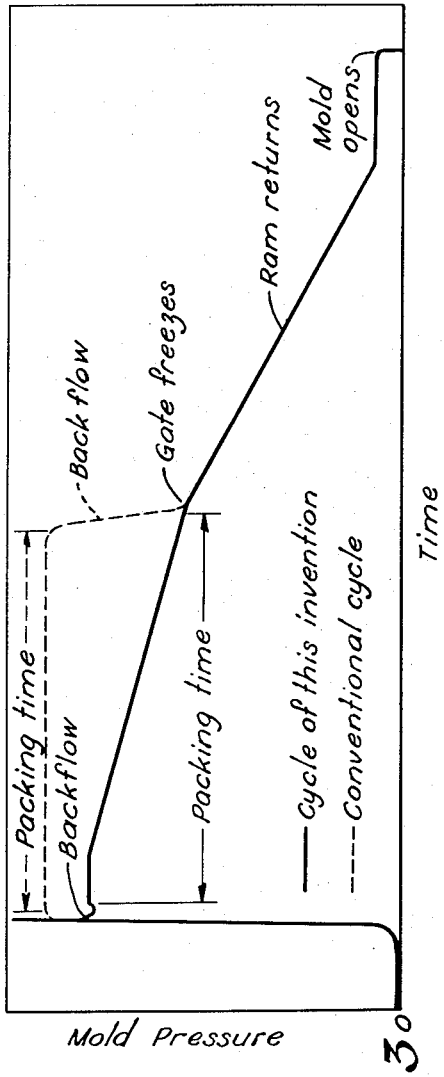

2,786,234

AUTOMATIC CONTROL IN THE INJECTION MOLDING CYCLE

Carlton E. Beyer, Midland, Mich., assignor to The Dow Chemical Company, Midland, Mich., a corporation of Delaware Application November 23, 1953, Serial No. 393,664

7 Claims. (Cl. 18—30)

This invention relates to the injection molding of organic thermoplastic materials. It relates in particular to an improved control of the molding cycle, and to means useful to effect such control.

In the well known process of injection molding, a hydraulic ram moves through a heated cylinder or barrel, forcing ahead of it a mass of molten thermoplastic material. The latter is expelled from the barrel, through a constricted nozzle, into a mold cavity. Pressure is normally maintained on the material in the mold, by keeping the ram advanced, until the molding has cooled enough to solidify in the mold gate. The mold is not opened to eject the molding until the latter is at a temperature below its heat distortion point. In order to produce acceptable moldings in repetitive operation, each forward movement of the ram must deliver enough molten plastic to the mold to fill it completely, and something must be done to continue feeding molten plastic into the mold while the initial charge is cooling and shrinking, if "sinks" are to be avoided, i. e., shrunken areas in the cooled article, no longer in conformity with the original pattern.

Standard practice has been to inject the initial charge at full ram pressure and to maintain such pressure as nearly as possible through the "packing" period. This has the disadvantage of forming moldings having residual strains which represent a potential weakness in the molded article. The molding process and the quality of the molded articles have been improved considerably by careful control of the amount of powdered or granular plastic material supplied to the machine before each forward stroke of the ram. Such control has been effected by "weigh-feeding" and by volume-feeding. In either case, the theoretical amount of material needed to fill the mold completely is supplied to the machine once in each cycle. These practices have reduced the average variation among successive moldings to the order of 0.5 to 1 percent by weight, but they cannot, of themselves, avoid or overcome the problem of sink formation due to shrinkage, or the problems arising due to strain lines in the molded articles.

When starting operations with a new mold, under conventional procedure, the operator must adjust at least four controls, several of them by trial and error, to produce acceptable moldings, and these may still exhibit the defects noted above. The factors requiring adjustment include cylinder temperature, ram pressure, ram forward time, and curing time, as well as the amount of feed to be supplied each cycle.

It is the principal object of this invention to provide a means for controlling the molding cycle automatically to provide molded articles having geometrical conformity to the mold and which are free from sink marks. A related object is to provide such automatic controls which, after simple adjustment of the packing pressure, to suit the mold being used, are substantially independent of plastic temperature and most other variables. A particular object is to provide such controls which can be used with any standard injection molding machine with a minimum alteration in the machine. Other objects may appear hereinafter.

The controls of the present invention comprise in combination, a pressure gauge to indicate the internal pressure in the mold; means responsive to the attainment of full ram pressure in the mold to reduce the hydraulic pressure on the ram sufficiently to permit backflow from the mold before shrinkage occurs, without retracting the ram, and for maintaining a packing pressure on the mold as long as the material in the gate is fluid; means responsive to the solidification of plastic material in the mold gate for retracting the ram; and means responsive to the attainment of a temperature in the molding at least as low as its heat distortion temperature to open the mold and to restore full communication between the hydraulic pressure source and the ram in preparation for the next cycle of operations.

The invention will be described with reference to the annexed drawings, in which Fig. 1 is a schematic view, partially in vertical section, of a typical injection molding machine, with the associated controls of this invention;

Fig. 2 is a graph of the changes in ram pressure during a molding cycle controlled in accordance with the invention; and Fig. 3 is a double graph showing pressure in the mold in the same molding cycle illustrated in Fig. 2, in comparison with the mold pressure curve in a conventional molding cycle.

The pressure gauge to be installed in a wall of the mold, for use in the control system of the invention, may be any gauge which is sensitive to pressure changes in the range from atmospheric pressure ("zero reading") to 15,000 or 20,000 pounds per square inch, and is preferably one which translates the applied pressure into electrical impulses proportional to the pressure. One such gauge, which it is preferred to use, is a mutual inductance pressure gauge described by F. E. Towsley and C. E. Beyer in "Modern Plastics," vol. 30, No. 8, pages 109–112, April 1953. That gauge may be mounted with a small piston flush with the mold wall. Pressure changes in the mold move the piston and alter the degree of compression of a cylindrical tube which acts as a spring. This, in turn, alters the distance between a metal plate, carried by the spring, and the fixed primary and secondary coils, thereby altering the mutual inductance of the coils. There is continuously applied to the primary coil a fixed voltage from a high frequency (2 megacycles per second) generator. The electrical impulse induced in the secondary coil is an inverse function of the distance between the two coils, and hence is directly proportional to the pressure in the mold. A simple means of calibration of such a gauge is described in the identified publication.

In the present control system, a pressure gauge having a full pressure deflection of not to exceed 0.0025 inch, is mounted with its sensing element flush with the interior wall of the mold. The gauge is connected with an electrical system in such manner that the deflections of the sensing element are converted into electrical impulses of magnitude proportional to the pressure. These impulses are conducted to an amplifier, to give a wider range of readings from the necessarily small range of deflections of the pressure gauge sensing element. The amplifier output is conducted to a recording controller of any standard type, and this is operatively connected with a valve in an air flow line in such manner that the flow of air is proportional to the pressure in the mold. The air operates a control valve in a by-pass line in the hydraulic system serving the injection ram, in such a manner that the air-operated valve is closed, and maximum hydraulic pressure is available to the ram, when the pressure in the mold is zero. Similarly, the air-operated valve is opened and the hydraulic pressure on the ram is reduced when full mold pressure has been attained. A switch is provided, for operation by the recorder-controller, to activate the ram return mechanism when the mold pressure has dropped so low as to indicate that the plastic material has solidified in the mold gate. The standard ram return mechanism includes a valve in the hydraulic line to the ram which diverts flow of the hydraulic fluid to the opposite face of the piston in the hydraulic cylinder.

Such valve may be operated electrically or mechanically, as by means of a cam which, in turn, may be set in motion in response to a predetermined change in the rate of air flow to the air-operated by-pass valve. If desired, and especially useful when making thick moldings, there may be installed in the mold wall a thermocouple whose lead wires are connected with the ram return mechanism in such a manner that the latter is not activated until the temperature of the molding is below its heat distortion temperature, even though the pressure in the mold may have dropped well below the preselected point at which the mechanism would normally be called into action. The operation of the new control system will be described more fully hereinafter, and it will become apparent that it leads to simplicity of operation and to a degree of uniformity in the molded products not heretofore attainable.

As indicated before, the closest approach to uniformity in injection molded thermoplastic articles has been made possible in the past by accurate weighing of the powdered or granular feed material, so that each stroke of the ram delivers into the mold the exact theoretical amount of feed to fill the mold. Slightly less consistent results are obtained when the feed is measured volumetrically, rather than by weight. Weight feeding gives commercial moldings which are within 0.5 percent of the desired weight, and volumetric feeding gives moldings within 0.7 percent of the desired weight, in commercial practice. In carefully controlled operations, slightly better results can be obtained. Thus, using molds with known capacities for polystyrene, the following results have been obtained with weigh feeding and with carefully controlled volumetric feeding. Each line in the table represents at least 10 moldings made under identical conditions.

*Table I*

(A) WEIGH FEED

| Feed Weight, grams | Piece Weight, grams | | Maximum deviation from average weight, percent |
| --- | --- | --- | --- |
| | Minimum | Maximum | |
| 161.0 | 158.475 | 160.990 | 0.75 |
| 161.0 | 158.323 | 158.890 | 0.18 |
| 158.0 | 158.401 | 158.220 | 0.165 |

(B) VOLUMETRIC FEED

| | | | |
| --- | --- | --- | --- |
| | 160.204 | 160.621 | 0.13 |
| | 159.934 | 160.621 | 0.215 |
| | 160.240 | 160.683 | 0.138 |

Although the weigh-feeder weighed the samples to within 0.06 percent of the desired amount, the moldings had much wider weight variations. It can be shown that, if the piece weight in a nominal 16-ounce molding varies by 0.5 percent, the mold pressure will vary by 1400 pounds per square inch, or nearly 10 percent of normal molding pressure. Since a mutual inductance pressure gauge can measure mold pressures to within one percent, it is seen that piece weights could be controlled to within 0.05 percent if such a gauge can be used to control the mold pressure within one percent.

A study of conventional molding practice has shown that prolonged maintenance of a low molding pressure does not, of itself, eliminate the sink in thick moldings.

The pressure which is adequate for packing is not sufficient to fill the mold properly. Hence, the present control system is designed to give an initial high pressure to fill the mold, followed by a reduction in pressure to one which is adequate to effect packing, and then a gradual increase in pressure as the piece cools to maintain the packing action on the decreasingly mobile plastic material.

At the start of a molding cycle, the pressure in the mold is atmospheric, or at the zero point on the pressure recorder. The by-pass valve in the hydraulic line is closed, and full hydraulic pressure is available to the ram for injection. This results in rapid filling of the mold and in substantial freedom from surface blemishes. When the mold is full, the pressure increases until full ram pressure is exerted thereon. On attainment of a pressure known to be adequate to fill the mold, the recorder-controller releases the full air stream to start opening the relief valve in the hydraulic line, thus lowering the pressure behind the ram. The mold pressure rises more rapidly than the hydraulic pressure on the ram is decreased, and a mold pressure is attained which is considerably above the required packing pressure. This insures complete filling of all parts of the mold cavity with the thoroughly plasticated feed. Before the mold pressure can reach such a high value as to cause the plastic material to flash at the parting line of the mold, the ram pressure drops low enough so that part of the initial mold charge flows back through the gate. This reduces pressure on the mold and results in a proportionate increase in the air flow to the relief valve, causing it to close partially, thereby increasing the hydraulic pressure on the ram to the required packing pressure. Since the described backflow from the mold occurs while the plastic is very hot and fluid, the molded article does not exhibit the evidences of internal strain which are noted when, in conventional molding practice, the backflow occurs after the packing period.

As the material cools in the mold, it continues to shrink, tending to reduce the mold pressure. This results in further opening of the relief valve in the hydraulic line and increases the ram pressure, so that the actual drop in pressure in the mold is very slow through the cooling period until the gate freezes. Thereafter, the mold pressure falls somewhat more rapidly, regardless of the ram pressure. At any time after this change occurs in the slope of the pressure curve, the ram may be retracted. To permit effective maintenance of a packing pressure on the mold for as long a time as possible before the plastic material can freeze in the gate, it is desirable that the mold be provided with a large gate.

A convenient means for determining when the ram may be retracted is a cam, activated by the recorder-controller when the recording arm indicates the attainment of a suitably low pressure during the cooling cycle. The cam is set to trip a microswitch to close the electrical circuit to the ram return mechanism, causing the conventional 4-way valve to admit hydraulic fluid to the front side of the plunger.

Another cam may be mounted on the recorder to trip another switch in the mold opening circuit when the recorder arm indicates a mold pressure within a few pounds of atmospheric pressure. Since mold pressure is not the only criterion of the attainment of a safe condition for opening the mold, an adidtional control is recommended. Thus, while moldings having only thin sections are cool enough to be discharged when the mold pressure approaches zero, moldings with sections of 0.25 inch or greater thickness will still be too hot to hold their true dimensions when the mold pressure first reaches a negligible value in the cooling cycle. To prevent the mold from opening too quickly, a thermocouple may be mounted at the internal surface of the mold and connected so as to close a contact in the mold-opening circuit only when the thermally induced voltage drops below a value which corresponds to the heat distortion temperature of the plastic material being molded. With this arrangement, the mold opening mechanism can function only when both the pressure and the temperature values have reached safe, low levels.

Since the ram return controls depend only on the attainment of a pressure low enough to indicate that the gate is frozen, these controls can be set permanently. The mold opening pressure control can also be permanently set, and the temperature control setting for the mold opening circuit requires adjustment only for changes in the material being molded, to be sure that the opening is not effected at a temperature above the heat distortion point. It will be shown in data presented hereafter that the temperature of the heating cylinder is not especially critical, when the present control system is being used, and that the main requirement is that the feed material become well plasticated. Hence, the only factor which requires adjustment by trial and error is the holding or packing pressure. The hydraulic pressure control on the injection molding machine is left at full pressure setting, as it has been found that variations in the pressure available to the ram have no effect so long as the pressure is great enough to insure filling the mold. Hence, with the present control system, much less time, fewer adjustments, and less waste of material is required to initiate successful operation with a new mold than in conventional molding operations.

Among the other advantages accruing to the use of the new control system is the fact that the cycle can be interrupted at any point and for any length of time, and then resumed, producing good moldings at once. In conventional practice, an interruption in cycle requires purging the heating chamber and is followed by making several bad moldings before settled and satisfactory conditions are attained.

The new control system also compensates automatically for changes in material, unless the new material has a much lower heat distortion temperature than the former one (and this is only important when thick moldings are being made). Thus, heavy moldings were made, in a 16-ounce machine, from a standard molding grade of polystyrene. The cycle time was 5 minutes and 40 seconds. Without stopping the machine, the feed was changed to an interpolymer of styrene and GR-S, known to have high impact properties. When the original polystyrene had been displaced from the machine, the cycle had changed to one of 6 minutes and 55 seconds, and all of the moldings made during and after the changeover were acceptable as to dimensional accuracy, surface finish and soundness.

To illustrate the degree to which the new control system compensates for changes in the temperature (or the viscosity) of the mtaerial being injected, a series of moldings was made while all control settings remained fixed except the temperature in the cylinder, which was varied as shown in the following Table II, from which it will be seen that the piece weight remained substantially constant and that good moldings were obtained over a wide temperature range.

*Table II*

| Heater Temp., ° F. | Total cycle | | Piece weight, grams |
|---|---|---|---|
| | Min. | Sec. | |
| 500 | 6 | 40 | 281.7 |
| 475 | 6 | 15 | 282.6 |
| 450 | 6 | 7 | 282.2 |
| 425 | 5 | 38 | 283.6 |
| 400 | 5 | 30 | 283.3 |
| 375 | 5 | 18 | 283.1 |
| 350 | 4 | 57 | 282.9 |
| 325 | 4 | 19 | 282.0 |

One of the most acute problems when injection molding heavy pieces, especially those which should have one or more flat surfaces, is the elimination of sink. The present control system, through maintenance of a low packing pressure, as described, assures the production of moldings of greater weight than conventional moldings in the same mold, and with freedom from sink. Thus, one mold had, as an element, a flat ring 1.188 inch wide, 6 inches outside diameter, and 0.625 inch thick. Conventional procedures failed to eliminate sink on the flat surface, and the average piece weight was 275 grams. When the new control system was used with the same mold and the same feed material, the piece weight had an average value of nearly 282 grams, and the pieces showed no evidence of sink.

A series of 33 consecutive moldings made in the mold just described, using the present automatic control system, was weighed. As shown from those weights, recorded in Table III, the average piece weight was 281.7 grams and the maximum deviation was 0.3 gram, or 0.106 percent. With the exception of one piece, the maximum deviation was 0.2 gram, or 0.07 percent.

*Table III*

| No. | Weight | No. | Weight | No. | Weight |
|---|---|---|---|---|---|
| 1 | 281.8 | 12 | 281.6 | 23 | 281.7 |
| 2 | 282.0 | 13 | 281.8 | 24 | 281.7 |
| 3 | 281.7 | 14 | 281.5 | 25 | 281.6 |
| 4 | 281.9 | 15 | 281.7 | 26 | 281.6 |
| 5 | 281.5 | 16 | 281.8 | 27 | 281.6 |
| 6 | 281.9 | 17 | 281.7 | 28 | 281.9 |
| 7 | 281.9 | 18 | 281.7 | 29 | 281.7 |
| 8 | 281.7 | 19 | 281.6 | 30 | 281.6 |
| 9 | 281.6 | 20 | 281.6 | 31 | 281.8 |
| 10 | 281.8 | 21 | 281.7 | 32 | 281.8 |
| 11 | 281.6 | 22 | 281.6 | 33 | 281.9 |

It is seen that timers and accurate feed controllers are not necessary, in order to make injection molded articles of consistently uniform size. It is also apparent that the invention makes possible a more faithful reproduction of the mold shape, through controlled packing during the cooling cycle.

I claim:

1. An injection molding cycle control for an injection molding machine having a hydraulically operated ram for forcing hot fluid plastic material through a mold gate into a mold comprising a pressure gauge with its sensing element flush with the internal wall of the mold and adapted to report the internal mold pressure in the full range from atmospheric pressure to the maximum pressure of which the injection molding machine is capable; means responsive to the attainment of full ram pressure in the mold to reduce the hydraulic pressure on the ram sufficiently to permit backflow of plastic material from the mold before shrinkage occurs, without retracting the ram, and for maintaining thereafter a progressively increasing packing pressure on the mold as long as the plastic material in the mold gate is fluid; means responsive to solidification of plastic material in the mold gate for retracting the ram; and means responsive to the attainment of a temperature in the molded plastic material at least as low as its heat distortion temperature to open the mold and to restore full communication between the hydraulic pressure source and the ram in preparation for the next cycle.

2. The molding cycle control claimed in claim 1, wherein the pressure gauge is a mutual inductance gauge, adapted to generate electrical impulses proportional to the internal mold pressure over the full range of such pressures.

3. The molding cycle control claimed in claim 2, wherein the means for reducing and for subsequently increasing the ram pressure comprises an amplifier for the induced current from the pressure gauge, a recorder-controller for recording the mold pressure equivalent to the said induced current, and a relief valve, in the hydraulic line supplying pressure to the ram, adapted to be opened by the said controller to reduce the ram pressure in response to the attainment of full pressure in the mold and to be closed progressively to increase the ram pressure in proportion to diminution of the mold pressure during the packing and cooling cycle.

4. The molding cycle control claimed in claim 1, wherein the means for retracting the ram comprises a cam, mounted on the mold pressure reporting means, set to close an electrical circuit to the normal ram return mechanism of the machine in response to an accelerated rate of decline of the mold pressure, during the cooling cycle, indicative that the material in the mold gate has frozen.

5. The molding cycle control claimed in claim 1, wherein the means to open the mold comprises a cam, mounted on the mold pressure reporting means, set to close an electrical circuit to the normal mold opening mechanism of the machine in response to the attainment of substantially atmospheric pressure in the mold during the cooling cycle.

6. The mold-opening means claimed in claim 5, comprising additionally a thermocouple in the wall of the mold, and means responsive to the existence in the mold of a temperature above the heat distortion point of the material being molded for interrupting the electrical circuit to the mold opening mechanism and responsive to the attainment of a temperature below said heat distortion point during the cooling cycle for closing that circuit, so that safe conditions of both temperature and pressure prevail in the mold before the mold can be opened.

7. The method of injection molding organic thermoplastic material which comprises supplying such material in plasticated condition to the mold under the full pressure of which the ram is capable, in quantity adequate to fill the mold completely; releasing the pressure at once sufficiently to allow backflow from the mold, then increasing the ram pressure while the mold pressure declines during the cooling cycle to effect packing of the mold, until the plastic material freezes in the mold gate; thereafter, retracting the ram and holding the plastic material in the mold until its temperature is below its heat distortion point.

References Cited in the file of this patent
UNITED STATES PATENTS

| | | |
|---|---|---|
| 2,372,833 | Jobst | Apr. 3, 1945 |
| 2,432,215 | Stocker | Dec. 9, 1947 |
| 2,476,272 | Bauman | July 19, 1949 |
| 2,671,247 | Lester | Mar. 9, 1954 |